(12) United States Patent
Barkeshli et al.

(10) Patent No.: US 11,848,721 B2
(45) Date of Patent: Dec. 19, 2023

(54) METHOD AND APPARATUS FOR CANCELLING ECHO SIGNALS HAVING DIFFERENT DYNAMIC RANGES

(71) Applicant: Marvell Asia Pte Ltd, Singapore (SG)

(72) Inventors: Sina Barkeshli, Saratoga, CA (US); Frank McCarthy, Alameda, CA (US); Ragnar Hlynur Jonsson, Aliso Viejo, CA (US); Seid Alireza Razavi Majomard, Belmont, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 17/815,461

(22) Filed: Jul. 27, 2022

(65) Prior Publication Data
US 2023/0033153 A1  Feb. 2, 2023

Related U.S. Application Data

(60) Provisional application No. 63/227,193, filed on Jul. 29, 2021.

(51) Int. Cl.
*H04B 3/23* (2006.01)
(52) U.S. Cl.
CPC ........................ *H04B 3/23* (2013.01)

(58) Field of Classification Search
CPC ......................................................... H04B 3/23
See application file for complete search history.

(56) References Cited

U.S. PATENT DOCUMENTS

| | | | | |
|---|---|---|---|---|
| 5,319,585 | A | * | 6/1994 | Amrany ............ H03H 21/0012 708/322 |
| 2018/0048396 | A1 | * | 2/2018 | Takatori ............... H03G 3/3042 |
| 2021/0399927 | A1 | * | 12/2021 | Razavi Majomard ... H04B 3/32 |

* cited by examiner

*Primary Examiner* — David B Lugo

(57) ABSTRACT

A physical layer transceiver for a wireline communications system includes a receive path for communicating signals received from the medium to a functional circuit, a transmit path for communicating signals received from the functional circuit onto the medium, and echo cancellation circuitry for cancelling from the receive path echoes of signals transmitted on the transmit path. The echo cancellation circuitry includes a plurality of high-dynamic-range filter segments, a plurality of low-dynamic-range filter segments, and control circuitry configured to detect on the receive path the echoes of the signals transmitted on the transmit path, classify each echo signal as having a low dynamic range or a high dynamic range, and deploy a high-dynamic-range segment to a location of an echo signal having a high dynamic range, and deploy a low-dynamic-range segment to a location of an echo signal having a low dynamic range.

20 Claims, 7 Drawing Sheets

METHOD AND APPARATUS FOR CANCELLING ECHO SIGNALS HAVING DIFFERENT DYNAMIC RANGES

CROSS REFERENCE TO RELATED APPLICATION

This disclosure claims the benefit of commonly-assigned U.S. Provisional Patent Application No. 63/227,193, filed Jul. 29, 2021, which is hereby incorporated by reference herein in its entirety.

FIELD OF USE

This disclosure relates to echo cancellation on a wireline communication channel. More particularly, this disclosure relates to the provision of separate echo cancellation filter types for echo signals having different dynamic ranges.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Filtering of high-speed wireline data channels includes echo cancellation. As data rates increase, the size of echo cancellation filters increases nonlinearly. For example, for a data rate in the 25 Gbps range, an echo cancellation filter may need about 1,000 taps. As a comparison, a feed-forward equalizer at that range may typically have only about 32 taps. As the number of taps increases, both the device area, and the power consumption, related to echo cancellation increase accordingly.

SUMMARY

In accordance with implementations of the subject matter of this disclosure, a physical layer transceiver for a wireline communications system, the physical layer transceiver transmitting data onto a wireline channel medium to a remote receiver and receiving data via the wireline channel medium from a remote transmitter, includes a receive path configured for coupling to the wireline channel medium and for communicating signals received from the wireline channel medium to a functional circuit, a transmit path configured for coupling to the wireline channel medium and for communicating signals received from the functional circuit onto the wireline channel medium, and echo cancellation circuitry coupled to the receive path and the transmit path and configured to cancel from the receive path echoes of signals transmitted on the transmit path, the echo cancellation circuitry including a first plurality of high-dynamic-range filter segments, a second plurality of low-dynamic-range filter segments, and control circuitry configured to detect on the receive path the echoes of the signals transmitted on the transmit path, classify each respective echo signal as having a low dynamic range or a high dynamic range, and deploy a respective filter segment in the first plurality of high-dynamic-range filter segments to a respective location of a respective echo signal classified as having a high dynamic range, and deploy a respective filter segment in the second plurality of low-dynamic-range filter segments to a respective location of a respective echo signal classified as having a low dynamic range.

In a first implementation of such a physical layer transceiver, the control circuitry may be configured to classify each respective echo signal as having a low dynamic range or a high dynamic range by comparing a time-domain characteristic of the respective echo signal to a threshold.

According to a first aspect of that first implementation, the control circuitry configures the threshold.

According to a second aspect of that first implementation, the control circuitry may be configured to detect on the receive path the echoes of the signals transmitted on the transmit path by performing cross-correlation of the receive path and the transmit path.

In a first instance of that second aspect, the control circuitry may be configured to compare the time-domain characteristic of the respective echo signal to the threshold by comparing, to the threshold, a metric derived from the cross-correlation.

In a first variant of that first instance, the control circuitry may be configured to deploy the respective filter segment in the first plurality of high-dynamic-range filter segments to the respective location of the respective echo signal classified as having a high dynamic range by, for each respective echo signal classified as having the high dynamic range, sorting the respective signal from a highest value of the metric in order of decreasing value of the metric, and deploying filter segments in the first plurality of high-dynamic-range filter segments to locations starting with a location corresponding to the highest value of the metric and to additional locations corresponding to the values of the metric in the order of decreasing value of the metric.

In a second variant of that first instance, the control circuitry may be configured to deploy the respective filter segment in the second plurality of low-dynamic-range filter segments to the respective location of the respective echo signal classified as having a low dynamic range by, for each respective echo signal classified as having the low dynamic range, sorting the respective signal from a highest value of the metric in order of decreasing value of the metric, and deploying filter segments in the second plurality of low-dynamic-range filter segments to locations starting with a location corresponding to the highest value of the metric and to additional locations corresponding to the values of the metric in the order of decreasing value of the metric.

In a second implementation of such a physical layer transceiver, each filter segment in the first plurality of high-dynamic-range filter segments and the second plurality of low-dynamic-range filter segments may be a rover filter segment configurable to correspond to a location along the wireline channel medium by adjustment of a respective delay line, and the control circuitry may be configured to deploy the respective filter segment in the first plurality of high-dynamic-range filter segments to the respective location of the respective echo signal classified as having the high dynamic range, and to deploy the respective filter segment in the second plurality of low-dynamic-range filter segments to the respective location of the respective echo signal classified as having the low dynamic range, by adjusting the respective delay line.

In a third implementation of such a physical layer transceiver, each filter segment in the first plurality of high-dynamic-range filter segments may have a first resolution, and each filter segment in the second plurality of low-dynamic-range filter segments may have a second resolution smaller than the first resolution.

According to a first aspect of that third implementation, each filter segment in the first plurality of high-dynamic-range filter segments may have tap coefficients having a first number of bits, and each filter segment in the second plurality of low-dynamic-range filter segments may have tap coefficients having a second number of bits smaller than the first number of bits.

In accordance with implementations of the subject matter of this disclosure, a method for cancelling, from signals received from a wireline channel medium on a receive path of a physical layer transceiver, echoes of signals transmitted from functional circuitry onto the wireline channel medium via a transmit path of the physical layer transceiver, includes detecting on the receive path the echoes of the signals transmitted on the transmit path, classifying each respective echo signal as having a low dynamic range or a high dynamic range, and deploying a respective filter segment in a first plurality of high-dynamic-range filter segments to a respective location of a respective echo signal classified as having a high dynamic range, and deploying a respective filter segment in a second plurality of low-dynamic-range filter segments to a respective location of a respective echo signal classified as having a low dynamic range.

In a first implementation of such a method, classifying each respective echo signal as having the low dynamic range or the high dynamic range may include comparing a time-domain characteristic of the respective echo signal to a threshold.

A first instance of that first implementation may further include configuring the threshold using control circuitry of the physical layer transceiver.

In a second instance of that first implementation, detecting on the receive path the echoes of the signals transmitted on the transmit path may include performing cross-correlation of the receive path and the transmit path.

In a first variant of that second instance, comparing the time-domain characteristic of the respective echo signal to the threshold may include comparing, to the threshold, a metric derived from the cross-correlation.

According to a first version of that first variant, comparing, to the threshold, the metric derived from the cross-correlation may include comparing, to the threshold, a sum of squares of the cross-correlation at different time lags.

According to a second version of that first variant, the method may include deploying the respective filter segment in the first plurality of high-dynamic-range filter segments to the respective location of the respective echo signal classified as having a high dynamic range by, for each respective echo signal classified as having the high dynamic range, sorting the respective signal from a highest value of the metric in order of decreasing value of the metric, and deploying filter segments in the first plurality of high-dynamic-range filter segments to locations starting with a location corresponding to the highest value of the metric and to additional locations corresponding to the values of the metric in the order of decreasing value of the metric.

That second version may include, when undeployed filter segments in the first plurality of high-dynamic-range filter segments remain after deploying filter segments in the first plurality of high-dynamic-range filter segments to all locations of the respective echo signal classified as having a high dynamic range, deploying the respective filter segment in the second plurality of low-dynamic-range filter segments to the respective location of the respective echo signal classified as having a low dynamic range by for each respective echo signal classified as having the low dynamic range, sorting the respective signal classified as having the low dynamic range from a highest value of the metric in order of decreasing value of the metric, deploying the remaining undeployed filter segments in the first plurality of high-dynamic-range filter segments to locations starting with a location corresponding to the respective signal classified as having the low dynamic range with the highest value of the metric and to additional locations of the respective signal classified as having the low dynamic range corresponding to the values of the metric in the order of decreasing value of the metric, and deploying filter segments in the second plurality of low-dynamic-range filter segments to additional locations, not filled by the filter segment s in the first plurality of high-dynamic-range filter segments, corresponding to the values of the metric in the order of decreasing value of the metric.

A third version of that second variant may include deploying the respective filter segment in the second plurality of low-dynamic-range filter segments to the respective location of the respective echo signal classified as having a low dynamic range by, for each respective echo signal classified as having the low dynamic range, sorting the respective signal from a highest value of the metric in order of decreasing value of the metric, and deploying filter segments in the second plurality of low-dynamic-range filter segments to locations starting with a location corresponding to the highest value of the metric and to additional locations corresponding to the values of the metric in the order of decreasing value of the metric.

A second implementation of such a method may include, when each filter segment in the first plurality of high-dynamic-range filter segments and the second plurality of low-dynamic-range filter segments is a rover filter segment configurable to correspond to a location along the wireline channel medium by adjustment of a respective delay line, deploying the respective filter segment in the first plurality of high-dynamic-range filter segments to the respective location of the respective echo signal classified as having the high dynamic range, and deploying the respective filter segment in the second plurality of low-dynamic-range filter segments to the respective location of the respective echo signal classified as having the low dynamic range, by adjusting the respective delay line.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
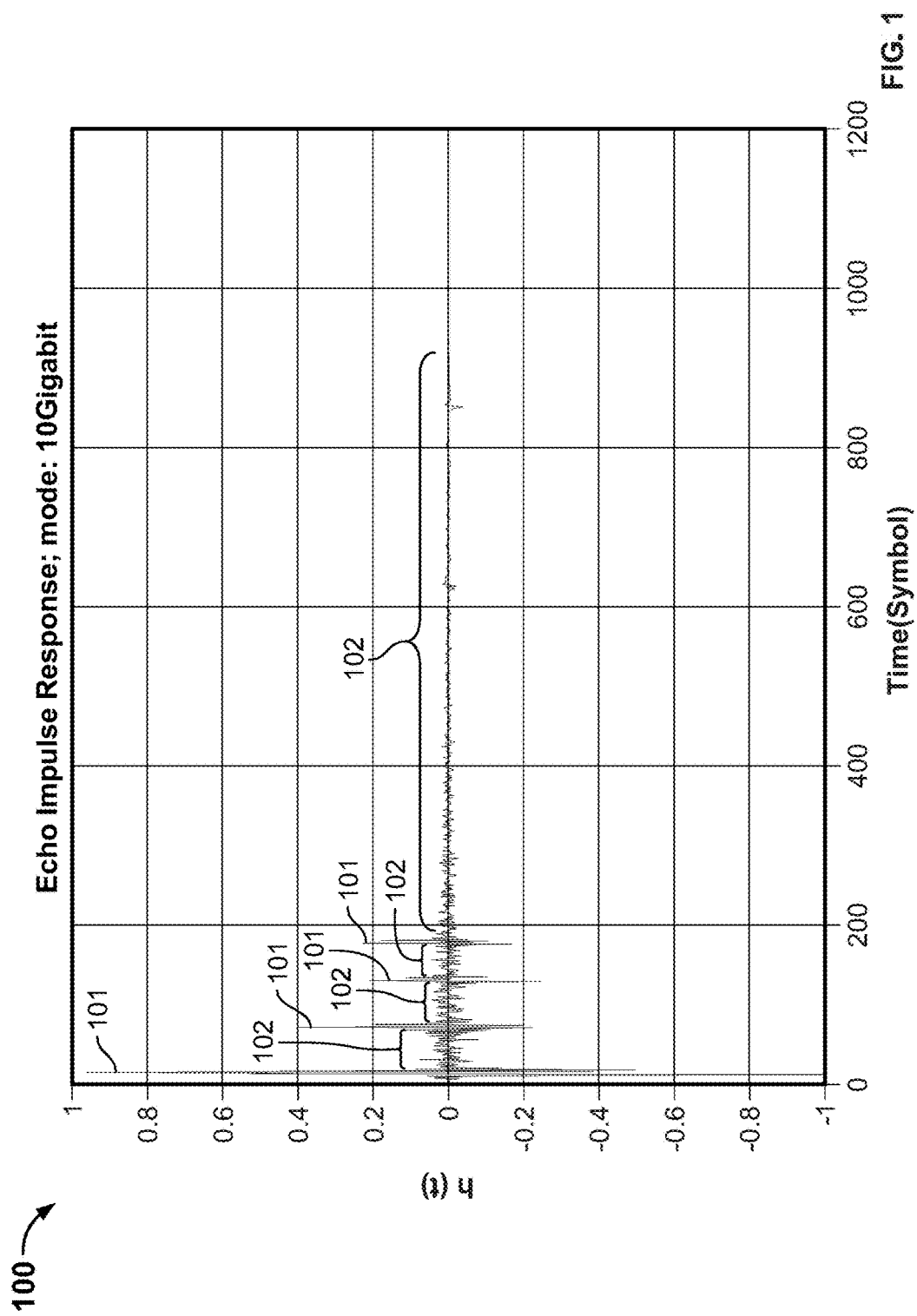
FIG. 1 is a graphic representation, in the time domain, of the impulse response of echo in a channel with which implementations of the subject matter of this disclosure may be used.

In some typical implementations, echo cancellation filter segments may have been deployed uniformly along a wireline Ethernet channel. Such implementations may be the most inefficient insofar as echoes may normally originate from portions of the channel having discontinuities or other sources of signal reflection, meaning many uniformly deployed echo cancellation filter segments are unnecessary and unnecessarily consume power and device area, while at the same time the decaying nature of an echo signal means that more echo cancellation filter segments may be needed at some locations—e.g., closer to the start of the echo. In other typical implementations, echo cancellation filter segments may have been deployed only to locations along the wireline Ethernet channel that give rise to echoes. However, even in those other implementations, typically all echo cancellation filter segments have been identical in their consumption of power and device area.

As noted above, as data rates increase, the size of echo cancellation filters—e.g., in an Ethernet PHY—increases nonlinearly. For example, for a data rate in the 25 Gbps range, an echo cancellation filter included in the PHY for echo cancellation may need about 1,000 taps. As a comparison, a feed-forward equalizer typically may include only about 32 taps at that data rate. Both the device area, and the power consumption, related to echo cancellation increase accordingly. Therefore, providing unnecessary echo cancellation filter segments, or filter segments all of the same type, unnecessarily consumes power and device area.

In accordance with implementations of the subject matter of this disclosure, device area and power consumption for echo cancellation filtering may be reduced not only by deploying echo cancellation filter segments to sources of echo or reflection rather than uniformly along the channel, but also by deploying different types of echo cancellation filter segments depending on the nature of the echoes to be cancelled. Specifically, in some implementations, for echoes with larger magnitudes, higher-dynamic-range echo cancellation filter segments—i.e., echo cancellation filter segments capable of filtering echoes with a range of magnitudes including large magnitudes—may be deployed, while for echoes with lower magnitude, lower-dynamic-range echo cancellation filter segments—i.e., echo cancellation filter segments capable of filtering echoes with a smaller range of magnitudes—may be deployed.

For example, for echoes characterized by a metric above a certain threshold, the higher-dynamic-range echo cancellation filter segments may be deployed, while for echoes characterized by a metric below that threshold, the lower-dynamic-range echo cancellation filter segments may be deployed. The higher-dynamic-range echo cancellation filter segments (which consume more power and area) may have higher resolution (i.e., more bits in the tap coefficients), while the lower-dynamic-range echo cancellation filter segments (which consume less power and area) may have lower resolution (i.e., fewer bit in the tap coefficients).

The magnitudes of the echoes, as well as the dynamic ranges of the echo cancellation filter segments, may be measured, in some implementations of the subject matter of this disclosure, by a time-domain metric such as intensity, or, in other implementations of the subject matter of this disclosure, by power. Alternatively, those magnitudes and dynamic ranges may be measured, in implementations of the subject matter of this disclosure, by a dimensionless metric that may be derived from, e.g., power.

The higher-dynamic-range echoes may correspond to physical discontinuities such as connectors, bends, kinks, or other discontinuities or sources of impedance mismatch, while the lower-dynamic-range echoes may correspond to micro-reflections caused by, e.g., manufacturing variations in the material of the channel medium. A PHY may include a first group of echo cancellation filter segments geared toward higher-dynamic-range echoes, and second group of echo cancellation filter segments geared toward lower-dynamic-range echoes. Generally, the echo cancellation filter segments geared toward the higher-dynamic-range echoes require more power and area, and therefore are more expensive, than echo cancellation filter segments geared toward lower-dynamic-range echoes.

Because the low-dynamic-range segments are smaller and less power-intensive, that means that more low-dynamic-range filter segments may be provided for the same area and power consumption, or alternatively, similar numbers of both types of filter segments can be provided, taking advantage of the area and power savings for the low-dynamic-range filter segments to reduce overall area and power consumption. Ultimately, the relative number of high-dynamic-range filter segments and low-dynamic-range filter segments may be a matter of design choice depending on the needs of a particular design. Generally, there may be expected to be more sources of lower-dynamic-range echoes than of higher-dynamic-range echoes. As a result, there may be more lower-dynamic-range filter segments than higher-dynamic-range filter segments provided in the PHY.

The echo cancellation filter segments may be "rover" filter segments that can be "moved" electronically to particular locations along the channel by adjusting a delay line, but do not actually move physically. For purposes of determining where to deploy the echo cancellation filter segments, echoes may be found by cross-correlation between the transmitted signal and the received signal. If the received and transmitted signals are correlated, that means that the content of the received signal includes content from the transmitted signal, signifying that an echo is being received. The lag between the transmission of particular content on the transmit channel, and the detection of that signal in the receive channel, is indicative of the distance from the transmission point in the time domain, which corresponds to a length along the channel medium.

The cross-correlation values may have the dimensions of power, and may be characterized in units of watts or dBW. However, for ranking the echoes in a given system, the cross-correlation values may be normalized to the highest value in the system, and the normalized values would be dimensionless.

After cross-correlations are computed at different lag values (e.g., a channel may be divided into as many as 1024 lag values), small groups of cross-correlations may be averaged to reduce clutter and noise. A metric may be computed and used to rank the sources of echo in decreasing order. For example, a sum-square cross-correlation metric may be computed and the summed squared cross-correlations may be sorted in order of decreasing value. Higher-dynamic-range echo cancellation rover segments may be deployed to positions corresponding to high values of the summed squared cross-correlation values, starting at the highest value of the summed squared cross-correlation values and proceeding to lower values of the summed squared cross-correlation values until all higher-dynamic-range echo cancellation rover segments have been deployed. Similarly, lower-dynamic-range echo cancellation rover segments may be deployed to positions corresponding to the highest values of the summed squared cross-correlation values that are below the threshold that separates the higher-dynamic-range echoes from the lower-dynamic range echoes, starting at the highest value, below the threshold, of the summed squared cross-correlation values and proceeding to lower values of the summed squared cross-correlation values until all low-dynamic-range echo cancellation rover segments have been deployed.

The threshold between high-dynamic-range echoes and low-dynamic-range echoes may be a controllable value— e.g., the threshold may be set by writing to a programmable register (either a user, or control circuitry, may write the threshold value after taking system measurements). In some implementations, the threshold may be determined based on the sorted sum-square-cross-correlation metric distribution and the number of the high-dynamic-range and low-dynamic-range filter segments that are available in the particular device. In particular, the threshold should not be set higher than the largest echo (or other interference) that can be filtered by the low-dynamic-range filter segments, so that a low-dynamic-range filter segment is not deployed to an echo that it is unable to filter. In other implementations, the threshold may be determined empirically from system measurements during set-up.

Normally one would expect that the number of higher-dynamic-range echoes would exceed the number of higher-dynamic-range echo cancellation filter segments, and that the number of lower-dynamic-range echoes would exceed the number of lower-dynamic-range echo cancellation filter segments, so that some higher-dynamic-range echoes remain unfiltered and some lower-dynamic-range echoes remain unfiltered. However, in some cases, the channel may be sufficiently "clean" that there are unused echo cancellation filter segments in one or both of the dynamic ranges.

The subject matter of this disclosure may be better understood by reference to FIGS. 1-7.

FIG. 1 is a graphic representation, in the time domain, of the impulse response 100 of echo in a channel. The particular illustrated in FIG. 1 is a 10 Gbps channel, but a high-speed channel at a different data rate may have a similar impulse response, with the abscissa scaled to the symbol rate accordingly. Each peak in FIG. 1 represents an echo received at a particular location after a time lag indicated on the abscissa (calibrated in units of data symbols). Each time lag is indicative of a distance from the particular location to the source of the echo (based on the speed at which a signal travels along the channel medium), and can be used to determine where to place echo cancellation circuitry.

The larger peaks, such as peaks 101, represent high-dynamic-range echoes (i.e., echoes with large amplitude ranges), caused by reflections from physical discontinuities in the channel, such as connectors, and bends or kinks in the channel medium, or certain type of filter such as a common-mode choke. The smaller peaks, such as peaks 102, represent low-dynamic-range echoes, caused by reflections from intrinsic impedance variations in the channel medium, such as manufacturing variations, inclusions and imperfections, which may be microscopic, and which also require cancellation.

Figure 2:
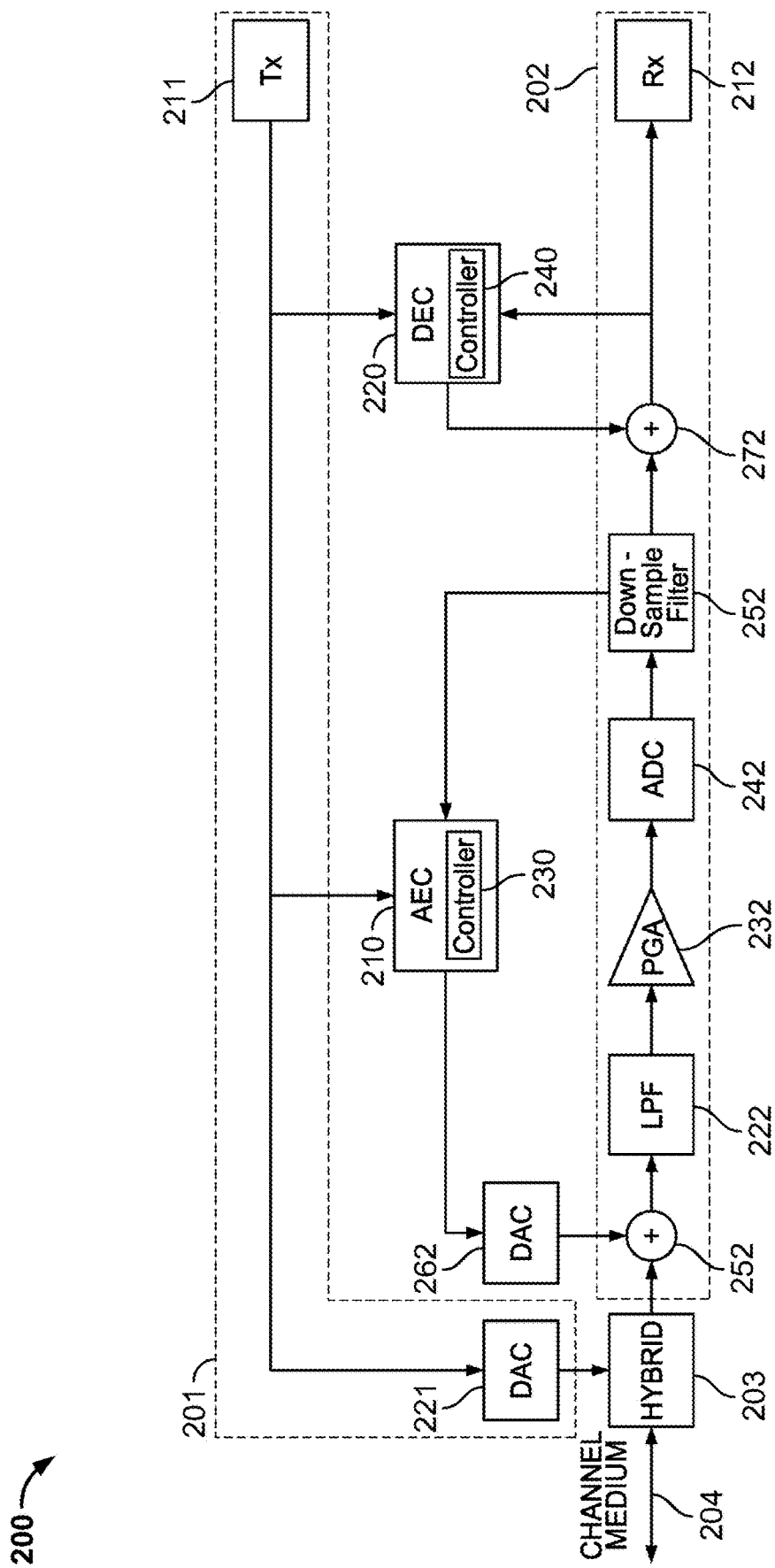
FIG. 2 is a block diagram of a physical layer transceiver that may incorporate echo cancellation circuitry according to implementations of the subject matter of this disclosure.

A physical layer transceiver 200 that may incorporate echo cancellation circuitry in accordance with the subject matter of this disclosure is shown in FIG. 2. PHY 200 includes a transmit path 201 and a receive path 202, coupled by hybrid coupler and transformer circuitry 203 to channel medium 204 (e.g., a coaxial or twisted-pair cable).

PHY 200 couples a functional circuit (not shown) to channel medium 204. PHY 200 is coupled to that functional circuit by transmit circuitry 211 of transmit path 201, and receive circuitry 212 of receive path 202. A digital-to-analog converter 221 converts transmit signals in transmit path 201 into analog signals for channel 204.

Receive path 202 includes a low-pass filter 222, a programmable-gain amplifier (PGA) 232 whose gain may be shaped across the operating band, an analog-to-digital converter (ADC) 242, and a down-sample filter 252, in addition to receive circuitry 212.

In the implementation shown, PHY 200 includes both analog echo cancellation circuitry 210, to cancel echoes in the analog receive path upstream of ADC 242, and digital echo cancellation circuitry 220, to cancel echoes in the digital receive path downstream of ADC 242. Either or both of analog echo cancellation circuitry 210 and digital echo cancellation circuitry 220 may incorporate implementations of the subject matter of this disclosure. As explained in more detail below, in either analog echo cancellation circuitry 210 or digital echo cancellation circuitry 220, the signal in receive path 202 is compared to the signal in transmit path 201, and if there is a correlation between the receive signal and the transmit signal, then the correlated signal is presumed to be an echo on receive path 202 of a signal transmitted on transmit path 201, and the respective analog echo cancellation circuitry 210 or digital echo cancellation circuitry 220 generates an inverse signal to be added to (i.e., a replica of the echo to be subtracted from) the signal on receive path 202 at 252 (after conversion by digital-to-analog (DAC) converter 262) or 272, respectively.

In accordance with implementations of the subject matter of this disclosure, either or both of analog echo cancellation circuitry 210 and digital echo cancellation circuitry 220 detects echoes of the transmit signal in the receive signal by performing a cross-correlation channel estimation of the receive signal and the transmit signal.

The received and the local transmitted signals $x(n)$, $y(n)$, where for $x(n)$, $0 \leq n \leq 2N-1$, and for $y(n)$, $0 \leq n \leq N-1$, based on the relative sizes of the transmit buffer (N) and the receive buffer (2N), which determine how much of each signal is available for comparison. For example, in some implementations, N=1024, making the size of the transmit buffer 1024 samples and the size of the receive buffer 2048 samples. The cross-correlation (channel estimation), $r(\text{lag})$, may be given by:

$$r(\text{lag}) = \left( \sum_{n=0}^{N-1} x(n + \text{lag}) y(n) \right)$$

where the $0 \leq \text{lag} \leq N-1$ (i.e., as expected, the number of lag values compared is equal to the smaller of the transmit and receive buffers). Each lag value represents a single sample, and therefore is equivalent to one clock period at the system clock rate. That temporal value may be converted to a distance along channel 204 (based on the speed at which signals travel through the channel), so that for any value large enough to warrant an echo cancellation filter segment, the position to which the echo cancellation filter segment should be deployed can be determined.

After the r(lag) values are determined, averaging may be performed over multiple cross-correlations to reduce the clutter and the noise to derive smoothed lag values $r_M(\text{lag})$:

$$r_M(\text{lag}) = \frac{1}{M}\left(\sum_{m=0}^{M-1} r_m(\text{lag})\right)$$

where M is the number of running average passes, 0≤m=M−1.

A further metric may be derived from the $r_M(\text{lag})$ values, primarily for data reduction, by taking the sum of the square of a small number of cross-correlations. For example, in one implementation, the squares of 8 cross-correlations may be computed, and then the sample window can be moved by 4 samples and 8 more cross-correlations (overlapping the previous grouping by 4) can be processed. This "sum-square-cross-correlation" metric may be derived as the sum of n (e.g., 8) squared averaged cross-correlations with a moving sum with an overlap of m (e.g., 4) lags, as follows:

$$SSM(j) = \sum_{n=0}^{7} r_M^2(n + j \times 4),$$

where j, in this implementation, may range from 0 to 249 (i.e., 250 lag positions).

Figure 3:
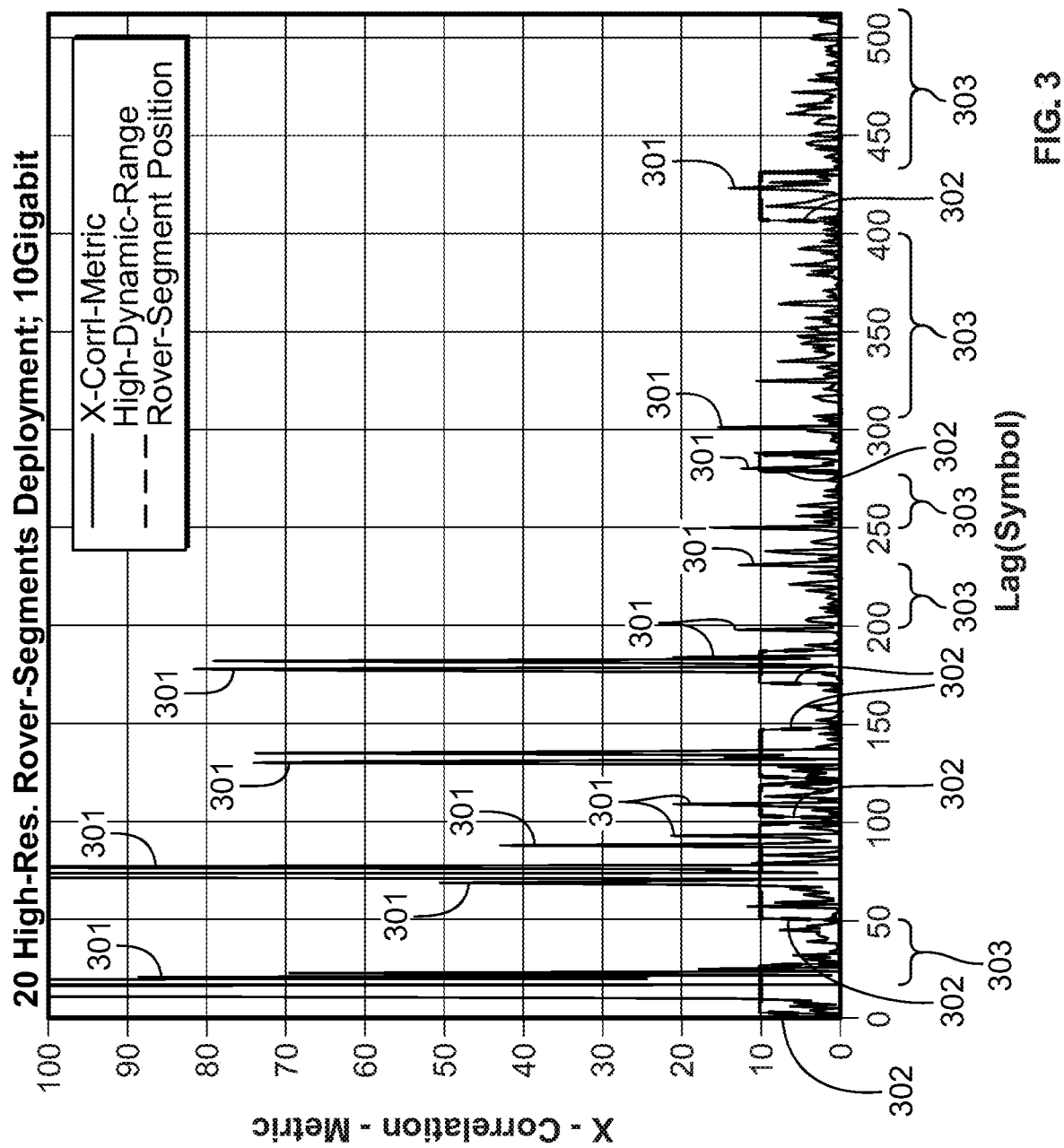
FIG. 3 is a graphic representation of a metric derived, according to implementations of the subject matter of this disclosure, from the impulse response of FIG. 1.

This sum-square cross-correlation metric may convert the impulse response shown in FIG. 1 to the graph shown in FIG. 3 where the larger spikes 301 (SSM>10 in this representation) represent the high-dynamic-range echoes. Therefore, one would aim to deploy high-dynamic-range filter segments to the locations 302 indicated by dashed lines. At other locations, with smaller spikes 303 (SSM<10 in this representation), one would aim to deploy low-dynamic-range filter segments.

Figure 4:
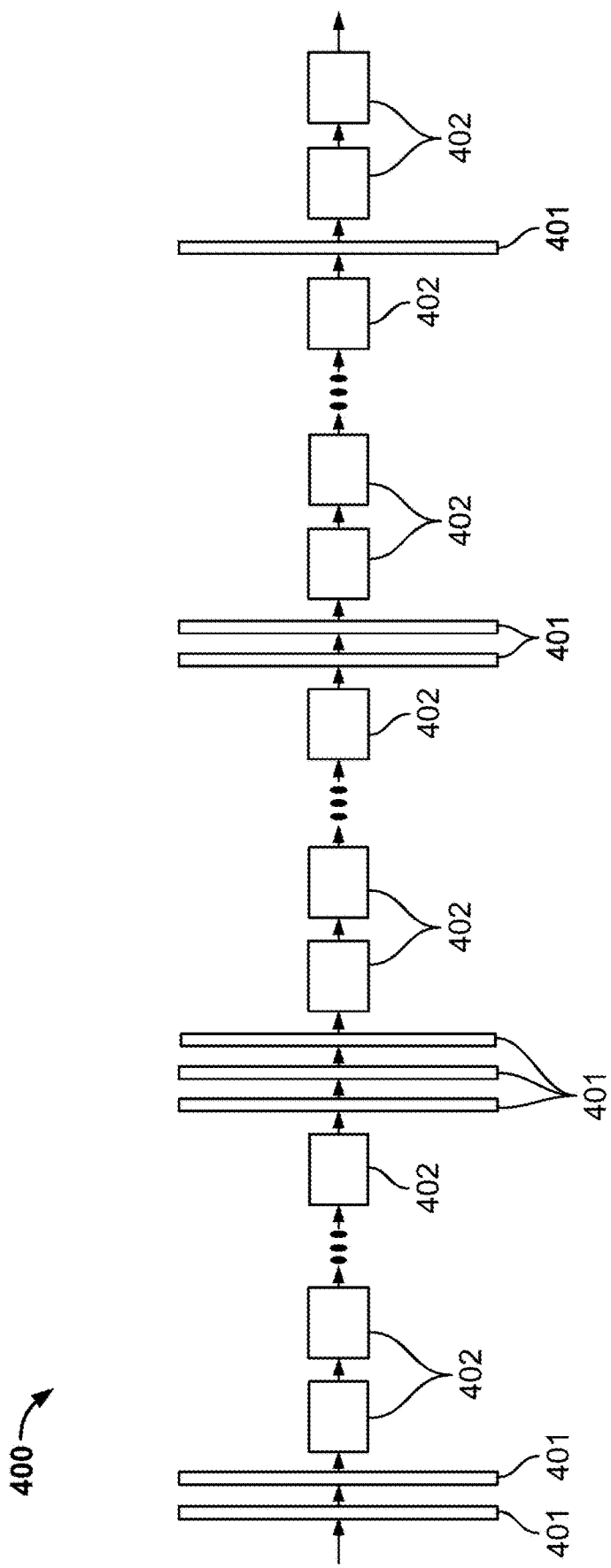
FIG. 4 represents a distribution of filter segments of different types according to an example implementation of the subject matter of this disclosure.
Figure 5:
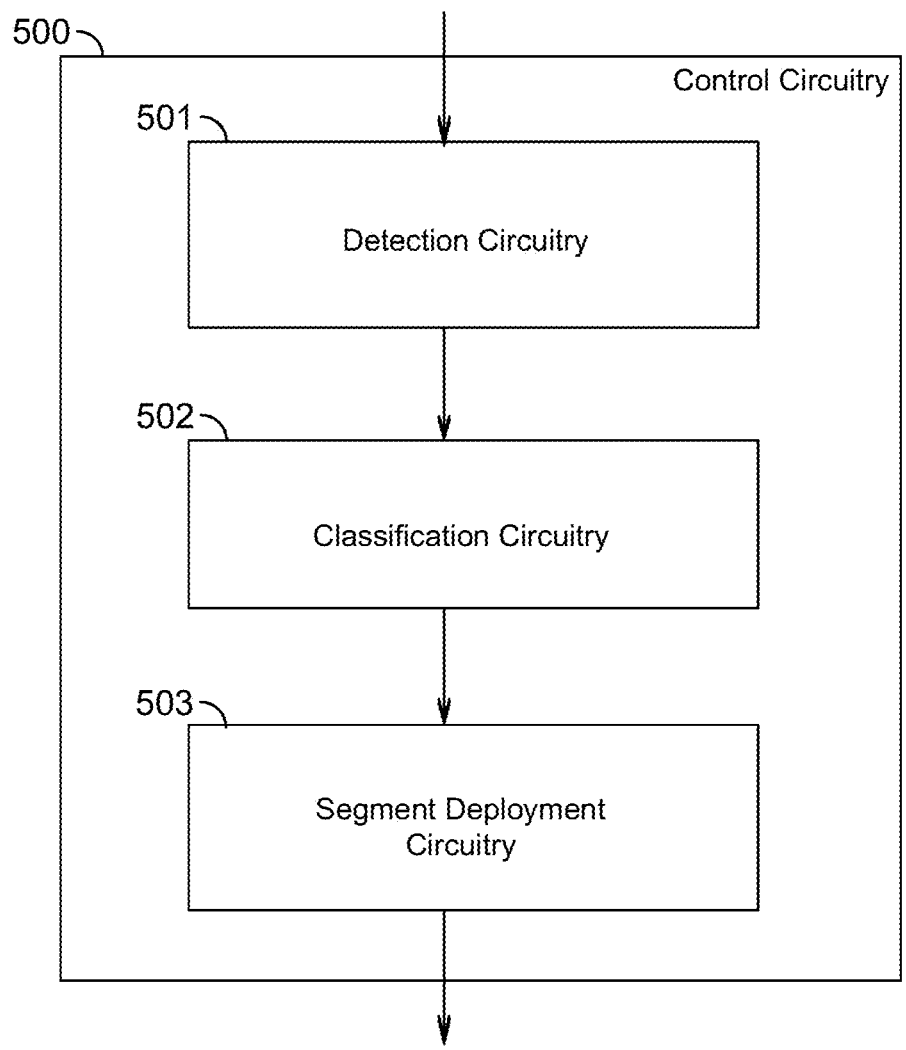
FIG. 5 is a high-level diagram of control circuitry in accordance with the subject matter of this disclosure.

FIG. 4 shows a distribution 400 of filter segments according to an example implementation of the subject matter of this disclosure, with high-dynamic-range rover filter segments 401 (depicted with large height and narrow width signifying high dynamic range and low resolution) interspersed with low-dynamic-range rover filter segments 402 (depicted with small height and wide width signifying low dynamic range and high resolution). In this example, the number of low-dynamic-range rover filter segments 402 exceeds the number of high-dynamic-range rover filter segments 401, and that relative distribution would be expected in most—but not necessarily all—actual implementations.

In accordance with implementations of the subject matter of this disclosure, after the distribution of echo locations is derived from the sum-square-cross-correlation metric as in FIG. 4 (or using any other metric), the determination of where to deploy the high-dynamic-range dynamic-range filter segments may be made by sorting all of the high-dynamic-range metric values in descending order and deploying high-dynamic-range rover filter segments 401 to the location with the largest metric first and then to locations with successively smaller metrics until there are no more high-dynamic-range filter segments 401 available to deploy. However, in some implementations, the number of locations to which high-dynamic-range filter segments 401 may need to be deployed could exceed the available number of high-dynamic-range filter segments 401. In those implementations, some of the high-dynamic-range echoes with smaller metrics may not be filtered.

Similarly, the determination of where to deploy the low-dynamic-range dynamic-range filter segments may be made by sorting all of the low-dynamic-range metric values in descending order and deploying low-dynamic-range rover filter segments 402 to the location with the largest metric first and then to locations with successively smaller metrics until there are no more low-dynamic-range filter segments 402 available to deploy. Normally, the number of locations to which low-dynamic-range filter segments 402 may need to be deployed would exceed the available number of low-dynamic-range filter segments 402. Thus, some of the low-dynamic-range echo locations with smaller metrics may not be filtered.

In rare circumstances, if a channel is particularly clean, there may be fewer high-dynamic-range echo locations than there are available high-dynamic-range filter segments 401. In that case, the "leftover" high-dynamic-range filter segments 401 could be deployed to the largest low-dynamic-range echo locations before any low-dynamic-range filter segments 402 are deployed, so that fewer low-dynamic-range echo locations remain unfiltered after all low-dynamic-range filter segments 402 have been deployed. However, the larger power consumption of the high-dynamic-range filter segments 401 may weigh against using the high-dynamic-range filter segments 401 for low-dynamic-range echoes.

The reverse situation, where they may be leftover low-dynamic-range filter segments 402, is less likely than the situation where there may be leftover high-dynamic-range filter segments 401. In any event, in such a situation, while individual ones of the low-dynamic-range filter segments 402 would be unable to cancel high-dynamic-range echoes for which high-dynamic-range filter segments 401 are unavailable, it may be possible to deploy multiple low-dynamic-range filter segments 402 to an individual lag position to cancel high-dynamic range echoes.

In a situation in which there are unused filter segments 401 or unused filter segments 402, any such unused filter segments may be turned off to conserve power.

The distribution of filter segments 401, 402, including the detection of the locations of echoes or other interference (such as by cross-correlation as described), the measurement of the magnitudes of those echoes or other interference sources, the derivation of any metric from those magnitudes, the sorting of the echoes by magnitude or metric, and the deployment of filter segments according to the sorted values, as described above, may be performed by control circuitry 230 in analog echo cancellation circuitry 210 when cancelling echoes in the analog domain, or by control circuitry 240 in digital echo cancellation circuitry 220 when cancelling echoes in the digital domain.

While in some implementations of the subject matter of this disclosure, detection and distribution of filter segments 401, 402 by respective control circuitry 230, 240 may occur in both analog echo cancellation circuitry 210 and digital echo cancellation circuitry 220, there may be situations where channel conditions are such that a desired quality of service may be achieved by performing detection and distribution of filter segments 401, 402 in accordance with the subject matter of this disclosure in either analog echo cancellation circuitry 210 or digital echo cancellation circuitry 220, but not both.

In some such situations, it may not be known in advance whether detection and distribution of filter segments 401, 402 in accordance with the subject matter of this disclosure will be required in analog echo cancellation circuitry 210 or digital echo cancellation circuitry 220. Therefore necessary control circuitry 230, 240 may be provided in both analog echo cancellation circuitry 210 and digital echo cancellation circuitry 220, even if only one is used in practice in some situations. Normally, if only one of control circuitry 230, 240 is used, it would be expected to be control circuitry 240 of digital echo cancellation circuitry 220, with control circuitry 230 of analog echo cancellation circuitry 210 remaining unused, but the reverse also is possible.

In other such situations it may be known in advance that detection and distribution of filter segments 401, 402 in accordance with the subject matter of this disclosure will be required only in analog echo cancellation circuitry 210 in which case control circuitry 240 may be omitted from digital echo cancellation circuitry 220, or will be required only in digital echo cancellation circuitry 220 in which case control circuitry 230 may be omitted from analog echo cancellation circuitry 210. Normally, if such a situation were to arise, it would be expected that detection and distribution of filter segments 401, 402 in accordance with the subject matter of this disclosure would be used only in digital echo cancellation circuitry 220, and would be omitted from analog echo cancellation circuitry 210.

In either case, control circuitry 230, 240 may include arithmetic circuitry and/or one or more processors for performing the aforementioned correlation calculations as well as for deriving any metrics (e.g., moving averages and sum-square-correlations) from the correlations and deploying filter segments accordingly. In some implementations, control circuitry 230, 240 may have the high-level structure 500 shown in FIG. 5, including detection circuitry 501 that, as described above, detects, on the receive path, echoes of the signals transmitted on the transmit path, classification circuitry 502 that classifies each respective echo signal as having a low dynamic range or a high dynamic range, and filter segment deployment circuitry 503 that adjusts the delay lines of the rover filter segments to move the first plurality of high-dynamic-range filter segments to respective locations of respective echo signals classified as having a high dynamic range, and to move the second plurality of low-dynamic-range filter segments to respective locations of respective echo signals classified as having a low dynamic range.

Channel conditions, including the distribution of echo locations along the wireline channel medium, may change over time. For example, changes in environmental conditions—including temperature changes, or simple movement of the wireline channel medium—may affect the distribution of echo locations. Therefore, the determination of echo locations, and the resulting distribution of filter segments 401, 402, may be repeated (e.g., at regular intervals). As a result, filter segments deployed at an initial set of locations may be redeployed to a different set of locations. This may include deploying a high-dynamic-range filter segment 401 to a location to which a low-dynamic-range filter segment 402 was previously deployed, or deploying a low-dynamic-range filter segment 402 to a location to which a high-dynamic-range filter segment 401 was previously deployed.

Figure 6:
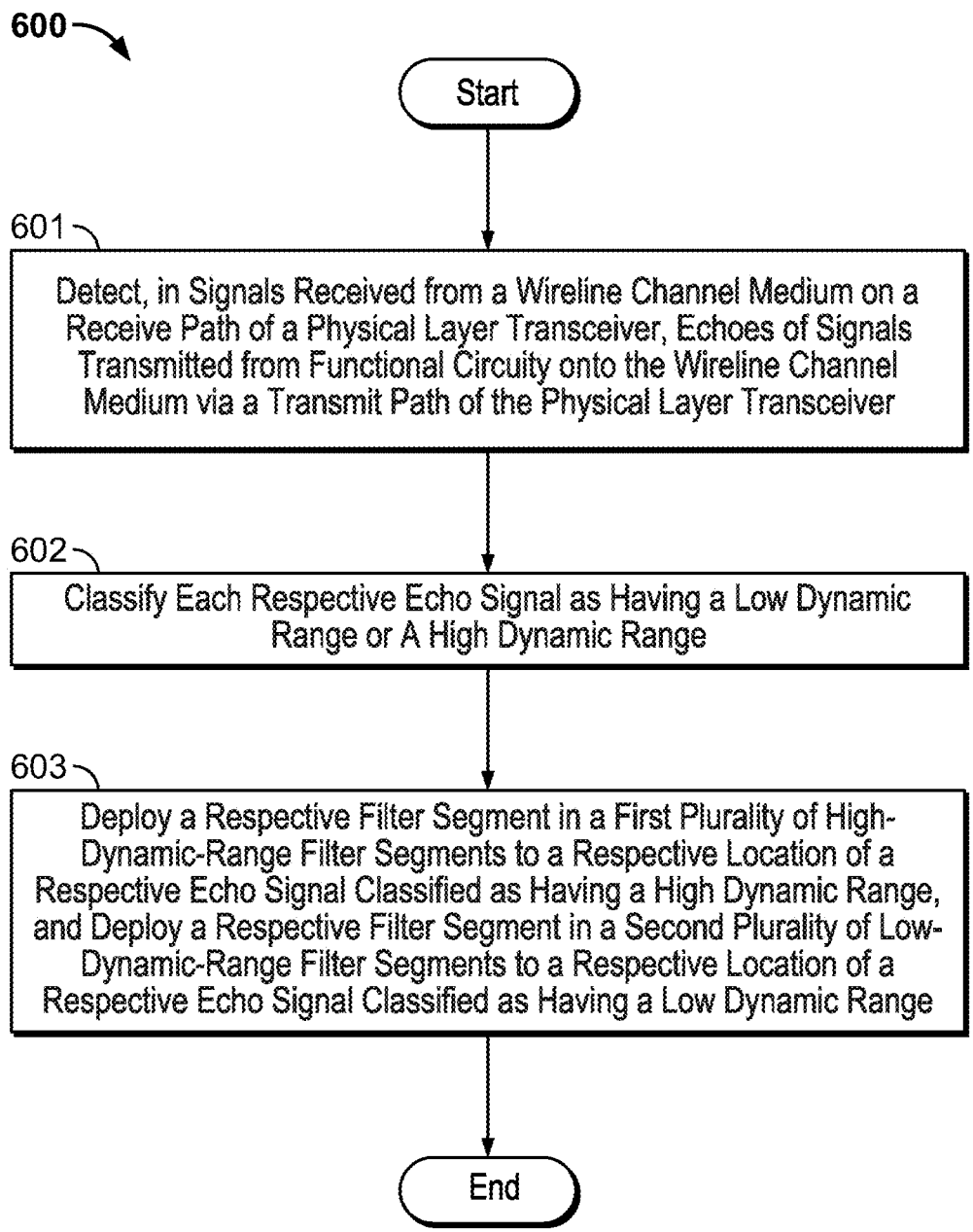
FIG. 6 is a flow diagram illustrating a method in accordance with implementations of the subject matter of this disclosure.

A method 600 according to implementations of the subject matter of this disclosure, for cancelling, from signals received from a wireline channel medium on a receive path of a physical layer transceiver, echoes of signals transmitted from functional circuity onto the wireline channel medium via a transmit path of the physical layer transceiver, is diagrammed in FIG. 6. Method 600 begins at 601, where the echoes of the signals transmitted on the transmit path are detected on the receive path. At 602, each respective echo signal is classified as having a low dynamic range or a high dynamic range. At 603, a respective filter segment in a first plurality of high-dynamic-range filter segments is deployed to a respective location of a respective echo signal classified as having a high dynamic range, and a respective filter segment in a second plurality of low-dynamic-range filter segments is deployed to a respective location of a respective echo signal classified as having a low dynamic range. Method 600 then ends, but may be repeated (e.g., at regular intervals).

Figure 7:
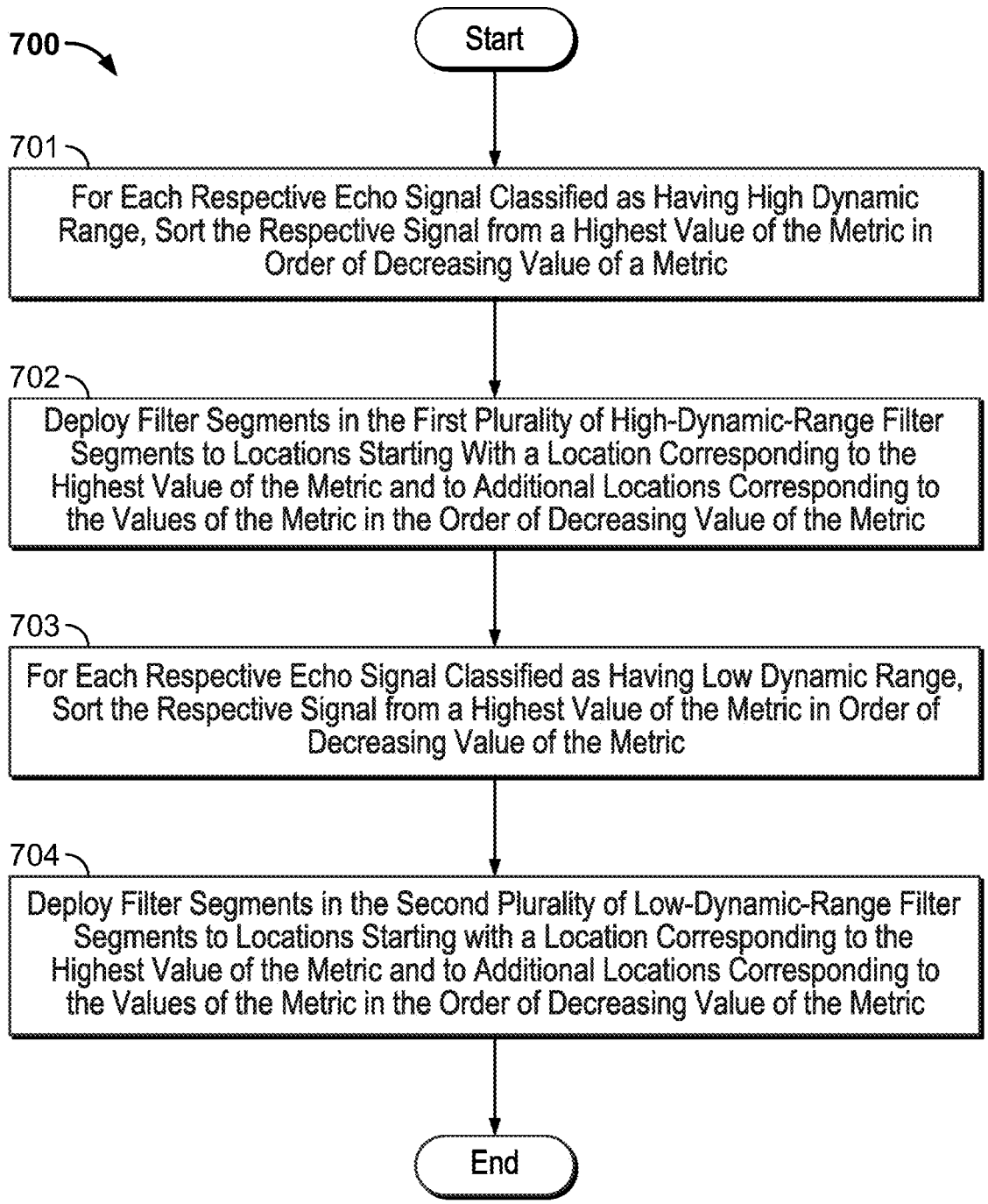
FIG. 7 is a flow diagram illustrating an implementation of a portion of the method diagrammed in FIG. 6, in accordance with implementations of the subject matter of this disclosure.

A method 700 according to implementations of the subject matter of this disclosure for performing deploying 603 is diagrammed in FIG. 7, and begins at 701 where for each respective echo signal classified as having high dynamic range, the respective signal is sorted from a highest value of the metric in order of decreasing value of a metric. At 702, filter segments in the first plurality of high-dynamic-range filter segments are deployed to locations starting with a location corresponding to the highest value of the metric and to additional locations corresponding to the values of the metric in the order of decreasing value of the metric. At 703, for each respective echo signal classified as having low dynamic range, the respective signal is sorted from a highest value of the metric in order of decreasing value of the metric. At 704, filter segments in the second plurality of low-dynamic-range filter segments are deployed to locations starting with a location corresponding to the highest value of the metric and to additional locations corresponding to the values of the metric in the order of decreasing value of the metric, and method 700 ends.

Thus it is seen that echo cancellation on a wireline communication channel, using separate echo cancellation filter types for echo signals having different dynamic ranges, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A physical layer transceiver for a wireline communications system, the physical layer transceiver transmitting data onto a wireline channel medium to a remote receiver and receiving data via the wireline channel medium from a remote transmitter, the physical layer transceiver comprising:
   a receive path configured for coupling to the wireline channel medium and for communicating signals received from the wireline channel medium to a functional circuit;
   a transmit path configured for coupling to the wireline channel medium and for communicating signals received from the functional circuit onto the wireline channel medium; and
   echo cancellation circuitry coupled to the receive path and the transmit path and configured to cancel from the receive path echoes of signals transmitted on the transmit path, the echo cancellation circuitry including:
   a first plurality of high-dynamic-range filter segments,
   a second plurality of low-dynamic-range filter segments, and control circuitry configured to:
  detect on the receive path the echoes of the signals transmitted on the transmit path,
  classify each respective echo signal as having a low dynamic range or a high dynamic range, and
  deploy a respective filter segment in the first plurality of high-dynamic-range filter segments to a respective location of a respective echo signal classified as having a high dynamic range, and deploy a respective filter segment in the second plurality of low-dynamic-range filter segments to a respective location of a respective echo signal classified as having a low dynamic range.

2. The physical layer transceiver of claim 1 wherein the control circuitry is configured to classify each respective echo signal as having a low dynamic range or a high dynamic range by comparing a time-domain characteristic of the respective echo signal to a threshold.

3. The physical layer transceiver of claim 2 wherein the control circuitry configures the threshold.

4. The physical layer transceiver of claim 2 wherein:
the control circuitry is configured to detect on the receive path the echoes of the signals transmitted on the transmit path by performing cross-correlation of the receive path and the transmit path.

5. The physical layer transceiver of claim 4 wherein:
the control circuitry is configured to compare the time-domain characteristic of the respective echo signal to the threshold by comparing, to the threshold, a metric derived from the cross-correlation.

6. The physical layer transceiver of claim 5 wherein:
the control circuitry is configured to deploy the respective filter segment in the first plurality of high-dynamic-range filter segments to the respective location of the respective echo signal classified as having a high dynamic range by:
  for each respective echo signal classified as having the high dynamic range, sorting the respective signal from a highest value of the metric in order of decreasing value of the metric, and
  deploying filter segments in the first plurality of high-dynamic-range filter segments to locations starting with a location corresponding to the highest value of the metric and to additional locations corresponding to the values of the metric in the order of decreasing value of the metric.

7. The physical layer transceiver of claim 5 wherein:
the control circuitry is configured to deploy the respective filter segment in the second plurality of low-dynamic-range filter segments to the respective location of the respective echo signal classified as having a low dynamic range by:
  for each respective echo signal classified as having the low dynamic range, sorting the respective signal from a highest value of the metric in order of decreasing value of the metric, and
  deploying filter segments in the second plurality of low-dynamic-range filter segments to locations starting with a location corresponding to the highest value of the metric and to additional locations corresponding to the values of the metric in the order of decreasing value of the metric.

8. The physical layer transceiver of claim 1 wherein:
each filter segment in the first plurality of high-dynamic-range filter segments and the second plurality of low-dynamic-range filter segments is a rover filter segment configurable to correspond to a location along the wireline channel medium by adjustment of a respective delay line; and
the control circuitry is configured to deploy the respective filter segment in the first plurality of high-dynamic-range filter segments to the respective location of the respective echo signal classified as having the high dynamic range, and to deploy the respective filter segment in the second plurality of low-dynamic-range filter segments to the respective location of the respective echo signal classified as having the low dynamic range, by adjusting the respective delay line.

9. The physical layer transceiver of claim 1 wherein:
each filter segment in the first plurality of high-dynamic-range filter segments has a first resolution; and
each filter segment in the second plurality of low-dynamic-range filter segments has a second resolution smaller than the first resolution.

10. The physical layer transceiver of claim 9 wherein:
each filter segment in the first plurality of high-dynamic-range filter segments has tap coefficients having a first number of bits; and
each filter segment in the second plurality of low-dynamic-range filter segments has tap coefficients having a second number of bits smaller than the first number of bits.

11. A method for cancelling, from signals received from a wireline channel medium on a receive path of a physical layer transceiver, echoes of signals transmitted from functional circuitry onto the wireline channel medium via a transmit path of the physical layer transceiver, the method comprising:
  detecting on the receive path the echoes of the signals transmitted on the transmit path;
  classifying each respective echo signal as having a low dynamic range or a high dynamic range; and
  deploying a respective filter segment in a first plurality of high-dynamic-range filter segments to a respective location of a respective echo signal classified as having a high dynamic range, and deploying a respective filter segment in a second plurality of low-dynamic-range filter segments to a respective location of a respective echo signal classified as having a low dynamic range.

12. The method for cancelling echoes according to claim 11 wherein classifying each respective echo signal as having the low dynamic range or the high dynamic range comprises comparing a time-domain characteristic of the respective echo signal to a threshold.

13. The method for cancelling echoes according to claim 12 further comprising configuring the threshold using control circuitry of the physical layer transceiver.

14. The method for cancelling echoes according to claim 12 wherein:
  detecting on the receive path the echoes of the signals transmitted on the transmit path comprises performing cross-correlation of the receive path and the transmit path.

15. The method for cancelling echoes according to claim 14 wherein:
  comparing the time-domain characteristic of the respective echo signal to the threshold comprises comparing, to the threshold, a metric derived from the cross-correlation.

16. The method for cancelling echoes according to claim 15 wherein:

comparing, to the threshold, the metric derived from the cross-correlation comprises comparing, to the threshold, a sum of squares of the cross-correlation at different time lags.

17. The method for cancelling echoes according to claim 15 comprising:
deploying the respective filter segment in the first plurality of high-dynamic-range filter segments to the respective location of the respective echo signal classified as having a high dynamic range by:
for each respective echo signal classified as having the high dynamic range, sorting the respective signal from a highest value of the metric in order of decreasing value of the metric, and
deploying filter segments in the first plurality of high-dynamic-range filter segments to locations starting with a location corresponding to the highest value of the metric and to additional locations corresponding to the values of the metric in the order of decreasing value of the metric.

18. The method for cancelling echoes according to claim 17 comprising, when undeployed filter segments in the first plurality of high-dynamic-range filter segments remain after deploying filter segments in the first plurality of high-dynamic-range filter segments to all locations of the respective echo signal classified as having a high dynamic range:
deploying the respective filter segment in the second plurality of low-dynamic-range filter segments to the respective location of the respective echo signal classified as having a low dynamic range by:
for each respective echo signal classified as having the low dynamic range, sorting the respective signal classified as having the low dynamic range from a highest value of the metric in order of decreasing value of the metric;
deploying the remaining undeployed filter segments in the first plurality of high-dynamic-range filter segments to locations starting with a location corresponding to the respective signal classified as having the low dynamic range with the highest value of the metric and to additional locations of the respective signal classified as having the low dynamic range corresponding to the values of the metric in the order of decreasing value of the metric; and
deploying filter segments in the second plurality of low-dynamic-range filter segments to additional locations, not filled by the filter segment s in the first plurality of high-dynamic-range filter segments, corresponding to the values of the metric in the order of decreasing value of the metric.

19. The method for cancelling echoes according to claim 15 comprising:
deploying the respective filter segment in the second plurality of low-dynamic-range filter segments to the respective location of the respective echo signal classified as having a low dynamic range by:
for each respective echo signal classified as having the low dynamic range, sorting the respective signal from a highest value of the metric in order of decreasing value of the metric, and
deploying filter segments in the second plurality of low-dynamic-range filter segments to locations starting with a location corresponding to the highest value of the metric and to additional locations corresponding to the values of the metric in the order of decreasing value of the metric.

20. The method for cancelling echoes according to claim 11 comprising, when each filter segment in the first plurality of high-dynamic-range filter segments and the second plurality of low-dynamic-range filter segments is a rover filter segment configurable to correspond to a location along the wireline channel medium by adjustment of a respective delay line:
deploying the respective filter segment in the first plurality of high-dynamic-range filter segments to the respective location of the respective echo signal classified as having the high dynamic range, and deploying the respective filter segment in the second plurality of low-dynamic-range filter segments to the respective location of the respective echo signal classified as having the low dynamic range, by:
adjusting the respective delay line.

* * * * *